United States Patent
Kwon

(10) Patent No.: US 9,619,136 B2
(45) Date of Patent: Apr. 11, 2017

(54) METHOD AND APPARATUS FOR SELECTING LINK ENTITIES IN TOUCH SCREEN BASED WEB BROWSER ENVIRONMENT

(75) Inventor: Won-Seok Kwon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/356,704

(22) Filed: Jan. 24, 2012

(65) Prior Publication Data

US 2012/0192107 A1 Jul. 26, 2012

(30) Foreign Application Priority Data

Jan. 24, 2011 (KR) .................. 10-2011-0006787

(51) Int. Cl.
*G06F 3/048* (2013.01)
*G06F 3/0488* (2013.01)
*G06F 3/0481* (2013.01)

(52) U.S. Cl.
CPC .......... *G06F 3/0488* (2013.01); *G06F 3/0481* (2013.01); *G06F 2203/04805* (2013.01); *G06F 2203/04806* (2013.01)

(58) Field of Classification Search
CPC .............. G06F 3/0482; G06F 3/04886; G06F 2203/04805; G06F 3/0236
USPC ........................................................ 715/801
See application file for complete search history.

(56) References Cited

U.S. PATENT DOCUMENTS

| | | | | |
|---|---|---|---|---|
| 2003/0147097 A1* | 8/2003 | Kotani | ................... | G06K 15/00 |
| | | | | 358/1.18 |
| 2008/0172618 A1* | 7/2008 | Han | ..................... | G06F 3/04812 |
| | | | | 715/738 |
| 2008/0259041 A1* | 10/2008 | Blumenberg | ....... | G06F 3/04842 |
| | | | | 345/173 |
| 2009/0048000 A1* | 2/2009 | Ade-Hall | .............. | G06F 3/0236 |
| | | | | 455/566 |
| 2009/0128505 A1* | 5/2009 | Partridge | ............ | G06F 3/04883 |
| | | | | 345/173 |
| 2009/0135147 A1* | 5/2009 | Hsu | ..................... | G06F 3/04883 |
| | | | | 345/173 |
| 2009/0322498 A1* | 12/2009 | Yun | ......................... | G06F 3/016 |
| | | | | 340/407.2 |
| 2010/0115398 A1* | 5/2010 | Yi | ......................... | G06F 3/0488 |
| | | | | 715/234 |
| 2010/0251176 A1* | 9/2010 | Fong | ................... | G06F 3/04886 |
| | | | | 715/821 |

(Continued)

*Primary Examiner* — William Bashore
*Assistant Examiner* — Rayeez Chowdhury
(74) *Attorney, Agent, or Firm* — Cha & Reiter, LLC

(57) ABSTRACT

A method and apparatus is provided for more easily selecting a desired one of a plurality of corresponding link entities displayed on a touch screen. The method includes verifying the number of link entities which exist within a touch region of a predetermined size around a touch point, and if the number of the link entities which exist within the touch region of the predetermined size is greater than or equal to a threshold value, displaying a window which enlarges and displays contents displayed on the touch region of the predetermined size by a certain magnification, and then waiting for touch and selection of one of the corresponding link entities enlarged and displayed on the window.

6 Claims, 8 Drawing Sheets

(56) References Cited

U.S. PATENT DOCUMENTS

| | | | |
|---|---|---|---|
| 2010/0275150 A1* | 10/2010 | Chiba | G06F 3/0488 715/784 |
| 2011/0134066 A1* | 6/2011 | Blumenberg | G06F 3/0482 345/173 |
| 2011/0254865 A1* | 10/2011 | Yee | G06F 3/013 345/661 |
| 2012/0144298 A1* | 6/2012 | Karlsson | G06F 3/0488 715/702 |
| 2012/0218308 A1* | 8/2012 | Lin | G06F 3/0482 345/660 |

* cited by examiner

METHOD AND APPARATUS FOR SELECTING LINK ENTITIES IN TOUCH SCREEN BASED WEB BROWSER ENVIRONMENT

CLAIM OF PRIORITY

This application claims the benefit under 35 U.S.C. §119(a) of the earlier filing date of a Korean patent application filed in the Korean Intellectual Property Office on Jan. 24, 2011 and assigned Serial No. 10-2011-0006787, the entire disclosure of which is hereby incorporated by reference.

BACKGROUND OF THE INVENTION

1. Field of the Invention

The present invention relates to a method and apparatus for selecting link entities in a touch screen based web browser environment. More particularly, the present invention relates to a method and apparatus for correctly selecting a corresponding link entity without an error touch of a user.

2. Description of the Related Art

Portable terminals such as mobile terminals, electronic schedulers, and personal complex terminals have become necessities of current society as a result of development by electronic communication industries. Portable terminals have developed into important means for information transmission, which information is quickly changing.

Portable terminal provide a variety of services on the basis of communication networks such as the widely used Internet. These services include an e-mail service, a remote computer connection service, a file transfer service, an Internet information search service, an Internet talking and discussion service, an electronic bulletin board service, a hypertext information reading service, etc. A touch screen is typically included as part of the portable terminal. When a finger of a user is in contact with the touch screen, the touch screen receives an input in accordance with a position that the users' finger contacted the touch screen. Thus, the touch screen helps the user to conveniently use the services available via the portable terminal.

However, because the portable terminal has been miniaturized and the services have become complex and diverse, it is increasingly difficult to use these services on the touch screen. For example, FIG. 1 illustrates an image displayed on a touch screen of a portable terminal, which image is used for selecting a corresponding link entity in a general web browser environment (e.g., webpage). Referring to FIG. 1, a user wants to come in contact with a corresponding link entity displayed on the image of the webpage and select the corresponding link with the user's finger, which finger is shown in dashed lines. If the link entity is selected, the current image is changed to a corresponding image such as a designated webpage image. However, because different link entities are concentrated around the selected link entity, the concentration of the link entities results in an error touch of the user.

SUMMARY OF THE INVENTION

An aspect of the present invention is to solve at least the above-mentioned problems and/or disadvantages and to provide at least the advantages described below. Accordingly, an aspect of the present invention is to provide a method and apparatus for correctly selecting a corresponding link entity without an erroneous touch of a user in a touch screen based web browser environment.

Another aspect of the present invention is to provide a method and apparatus for correctly selecting one entity of a plurality of entities that are concentrated in a touch screen based web browser environment.

Another aspect of the present invention is to provide a method and apparatus for enlarging and displaying concentrated link entities and waiting for selection of one of the enlarged and displayed link entities.

In accordance with an exemplary embodiment of the present invention, a method of selecting link entities in a touch screen based web browser environment is provided. The method includes verifying the number of link entities which exist within a touch region of a predetermined size around a touch point, and if the number of the link entities which exist within the touch region of the predetermined size is greater than or equal to a threshold value, displaying on the touch screen a window which enlarges and displays contents displayed on the touch region of the predetermined size by a certain magnification, and then waiting for touch and selection of one of the corresponding link entities enlarged and displayed on the window.

In accordance with another exemplary embodiment of the present invention, a method of selecting link entities in a touch screen based web browser environment is provided. The method includes verifying whether different link entities adjacent to a selected link entity within a touch size are touched and selected, and setting a touch region of a corresponding size including the touch size if the different link entities are touched and selected, displaying a window which enlarges and displays contents displayed on the touch region by a certain magnification, and waiting for touch and selection of one of corresponding link entities enlarged and displayed on the window.

In accordance with yet another exemplary embodiment of the present invention, an apparatus for selecting link entities in a touch screen based web browser environment is provided. The apparatus includes a touch screen unit for providing input and output functions to a user, a storage unit for storing data, a communication unit for performing communication, and a controller for performing an overall operation, wherein if the number of link entities which exist within a touch region of a predetermined size is greater than or equal to a threshold value, the controller displays a window which enlarges and displays contents displayed on the touch region of the predetermined size by a certain magnification and waits for touch and selection of one of the corresponding link entities enlarged and displayed on the window.

In accordance with still another exemplary embodiment of the present invention, an apparatus for selecting link entities in a touch screen based web browser environment is provided. The apparatus includes a touch screen unit for providing input and output functions to a user, storage unit for storing data, a communication unit for performing communication, and a controller for performing an overall operation, wherein if different link entities adjacent to a selected link entity within a touch size are touched and selected, the controller sets a touch region of a corresponding size including the touch size, displays a window which enlarges and displays contents displayed on the touch region by a certain magnification, and waits for touch and selection of one of corresponding link entities enlarged and displayed on the window.

Other exemplary aspects, advantages and salient features of the invention will become apparent to a person of ordinary skill in the art from the following detailed description, which, taken in conjunction with the annexed drawings, discloses exemplary embodiments of the invention in more detail.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION

The following description, with reference to the accompanying drawings, is provided to assist a person of ordinary skill in the art with a comprehensive understanding of exemplary embodiments of the invention. The description includes various specific details to assist in that understanding but these details are to be regarded as merely exemplary. Accordingly, those of ordinary skill in the art will recognize that various changes and modifications of the exemplary embodiments described herein can be made without departing from the spirit of the invention and the scope of the appended claims. Also, descriptions of well-known functions and constructions may be omitted for clarity and simplicity so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

By the term "substantially" typically means that the recited characteristic, parameter, or value need not be achieved exactly, but that deviations or variations, including for example, tolerances, measurement error, measurement accuracy limitations and other factors known to those skilled in the art, and may occur in amounts that do not preclude the effect the characteristic was intended to provide.

The present invention described hereinafter relates to a method and apparatus for selecting a link entity in a touch screen based web browser environment. Particularly, the prevent invention relates to a method and apparatus for correctly selecting a corresponding link entity in a manner to as to prevent an erroneous touch of a user. The prevent invention relates to a method and apparatus for enlarging and displaying concentrated link entities in a touch screen based web browser environment and waiting for selection of one of the enlarged and displayed link entities.

Figure 1:
FIG. 1 illustrates a window displaying an image (hereinafter referred to as a picture) which is useful for selecting a corresponding link entity in a general web browser environment in accordance with the prior art.
Figure 2:
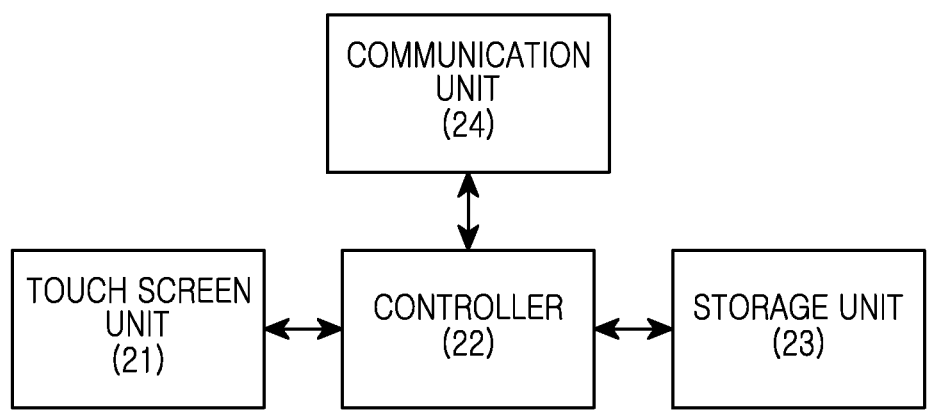
FIG. 2 is a block diagram of a touch screen terminal according to one embodiment of the present invention.

FIG. 2 is a block diagram of a touch screen terminal according to one embodiment of the present invention.

The touch screen terminal includes a touch screen unit 21 for enabling the performance of input and output functions, a storage unit 23 for storing data, a communication unit 24 for performing communication, and a controller 22 for controlling an overall operation within a touch screen terminal.

The touch screen unit 21 outputs to the controller 22 an output signal according to a touch of a user, and receives and displays display data corresponding to an input signal in response to control by the controller 14.

The storage unit 23 stores (for example in a ROM, not specifically shown, but well known in the art) a predetermined program for controlling an overall operation of the touch screen terminal, as well as instructions for enabling a variety of data input and output functions when a control operation of the touch screen terminal is performed. Such predetermined programs for controlling an overall operation of a touch screen terminal are well known by those of ordinary skill in the art and therefor further description thereof is not provided in the interest of clarity and brevity.

The communication unit 24 is adapted to transmit and receive a wire or wireless signal, as also well known by those of ordinary skill in the art.

The controller 24 controls an overall operation of the touch screen terminal. Hereinafter, a link selection method of the controller 14 in a web browser environment will be described in detail with reference to drawings.

Figure 3A:
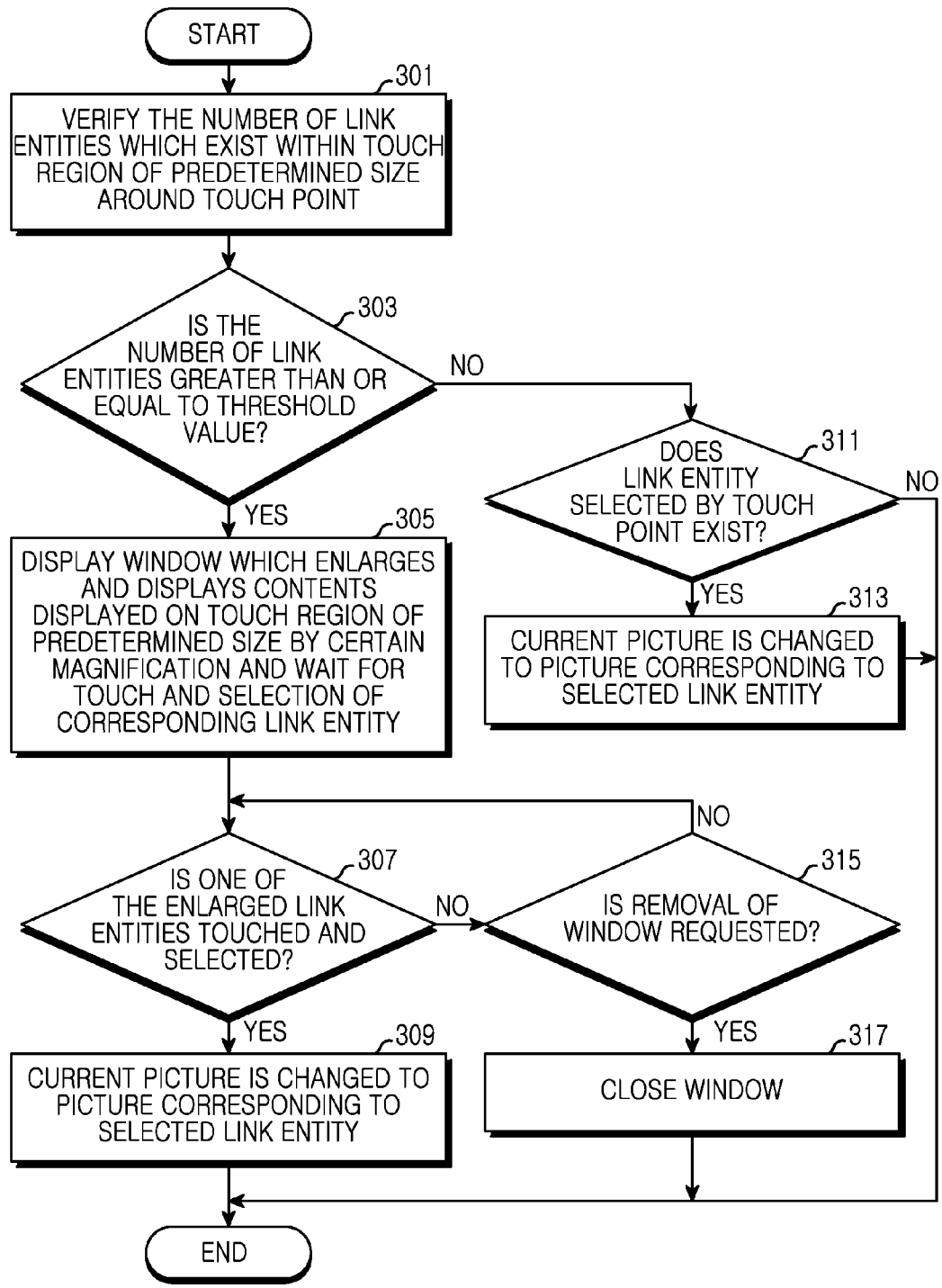
FIG. 3A is a flowchart illustrating a process of selecting a corresponding link entity in a web browser environment according to another embodiment of the present invention.

FIG. 3A is a flowchart illustrating a process of selecting a corresponding link entity in a web browser environment according to another embodiment of the present invention.

Referring to FIG. 3A, the controller 22 determines the number of link entities which exist within a touch region of a predetermined size around a touch point (step 301).

The controller 22 verifies whether the number of the link entities which exist within the touch region of the predetermined size is greater than or equal to a threshold value (step 303).

If the number of the link entities which exist within the touch region of the predetermined size is greater than or equal to the threshold value, the controller 22 displays a window which enlarges and displays contents displayed on the touch region of the predetermined size by a certain magnification, and waits for touch and selection of a corresponding link entity on the window (step 305). That is, a user may touch and select one of the enlarged link entities.

If one of the enlarged link entities is touched and selected (step 307), the controller 22 changes the current picture to a picture corresponding to the selected link entity (step 309).

If one of the enlarged link entities is not selected and removal of the window is requested (step 315), the controller 22 closes the window (step 317). For example, if the user touches a touch region outside of the window, the removal of the window may be requested.

If the number of link entities which exist within the touch region of the predetermined size is less than the threshold value, the controller 22 determines whether a link entity selected by the touch point exists (step 311). If the selected link entity exists, the controller 22 changes the current picture to a picture corresponding to the selected link entity (step 313). However, if the selected link entity does not exist, that is, if the touch point exists within a region but the link entity does not exist within the region, the controller 22 ends the above-mentioned process.

Figure 3B:
FIG. 3B and FIG. 3C illustrate a picture useful for selecting a corresponding link entity in a web browser environment according to another embodiment of the present invention.
Figure 3C:
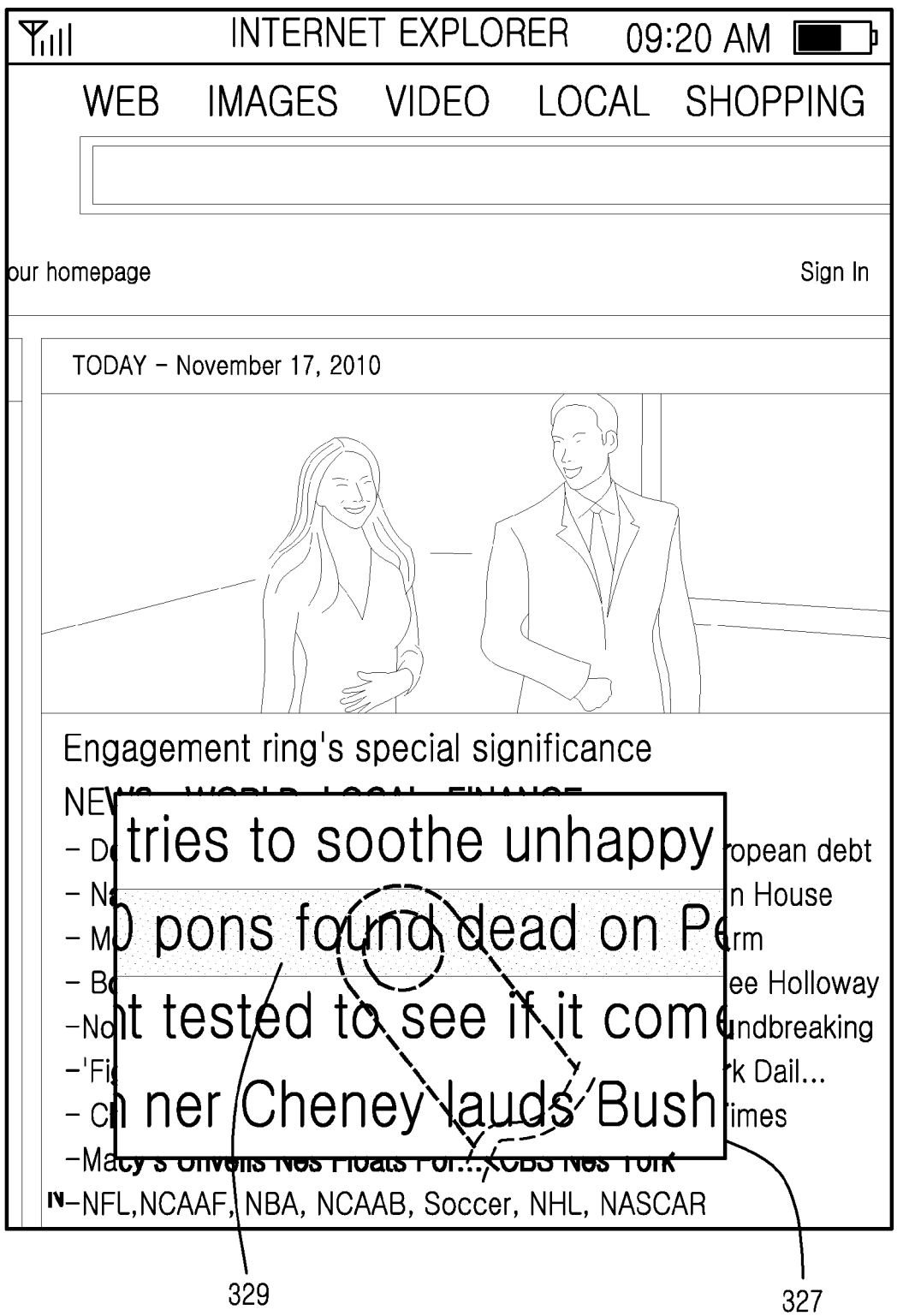

FIG. 3B and FIG. 3C illustrate a displayed picture useful for selecting a corresponding link entity in a web browser environment according to another embodiment of the present invention which may use the process of FIG. 3A.

Referring to FIG. 3B and FIG. 3C, a webpage accessed by the portable terminal via the Internet is displayed for a user to read. The webpage includes entities such as letters and images. The entities on the webpage are linked. For example, if a corresponding link entity is designated by being touched and selected, the current picture being displayed is changed to a picture which displays a designated webpage.

It is generally known, as noted above, to be difficult for the user to touch and select one of a plurality of concentrated link entities with the user's finger 321. Accordingly, as described above, if the number of link entities which exist within a touch region 325 of a predetermined size around a touch point 323 is greater than or equal to a threshold value, as shown by FIG. 3C, the controller 22 displays a window 327 which enlarges and displays contents displayed on the touch region 325 by a certain magnification. The user may touch and select one of the link entities enlarged and displayed on the window 327. That is, the user may select an intended one 329 of the link entities enlarged and displayed on the window 327 without an error touch. If the user touches a region which is not within the window 327, the controller 22 closes the window 327. However, if the number of the link entities which exist within the touch region 325 of the predetermined size around the touch point 323 is less than the threshold value, the controller 22 verifies whether a link entity selected by the touch point 323 exists. If the selected link entity exists, the controller 22 changes the current picture to a picture corresponding to the selected link entity. However, if the selected link entity does not exist, that is, if the touch point 323 exists within a region but the link entity does not exist within the region, the controller 22 ends the above-mentioned process.

Figure 4A:
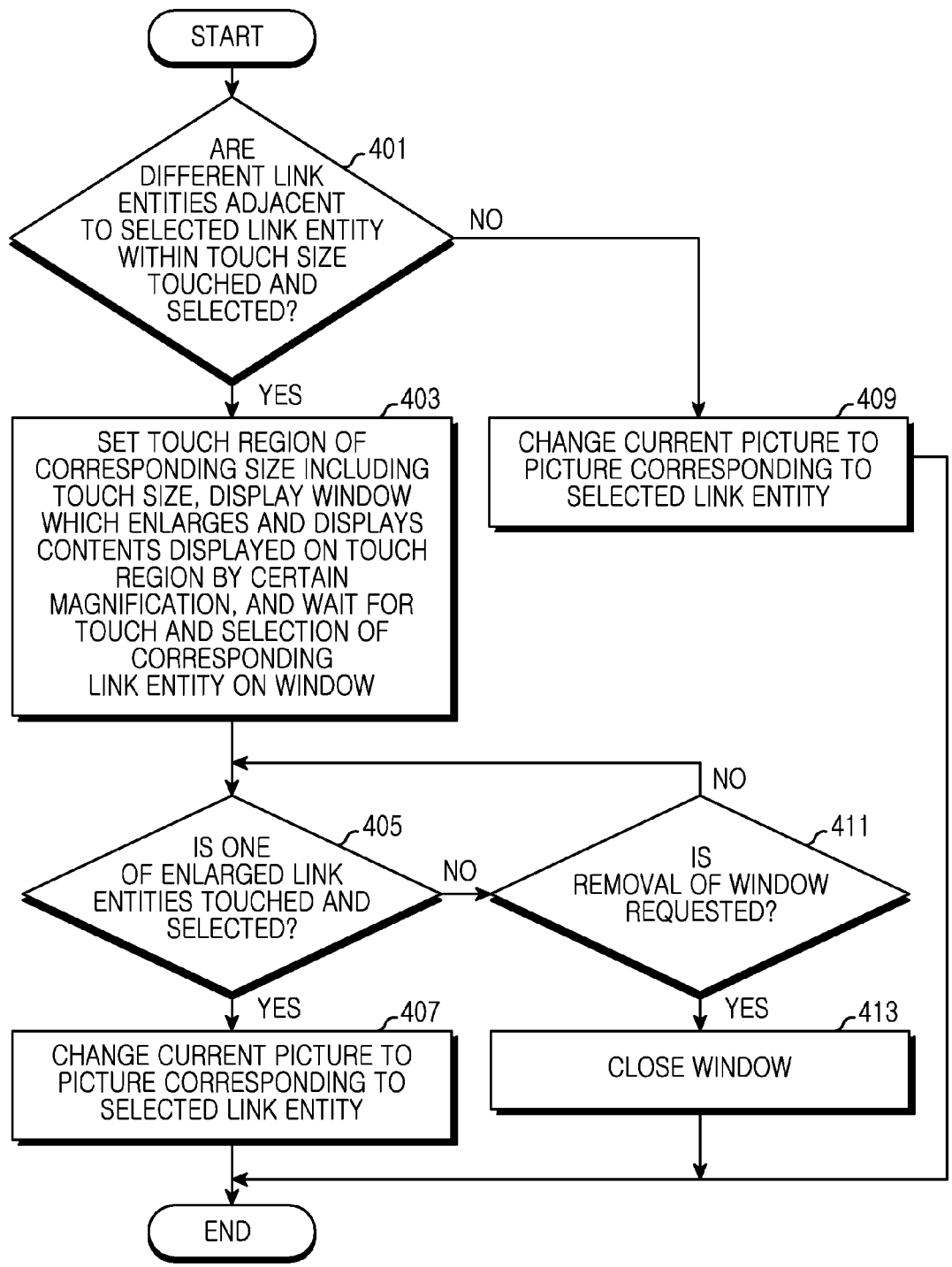
FIG. 4A is a flowchart illustrating a process of selecting a corresponding link entity in a web browser environment according to another embodiment of the present invention.

FIG. 4A is a flowchart illustrating a process of selecting a corresponding link entity in a web browser environment according to another embodiment of the present invention.

Referring to FIG. 4A, the controller 14 determines whether a link entity adjacent to a selected link entity within a touch size (area) is touched and selected (step 401), that is, if two or more different link entities are touched and selected. If a finger of a user is in contact with a touch region, a certain touch size is generated. An example where the different link entities are touched and selected is when at least two or more link entities exist within the touch size. For example, the controller 22 determines that two or more link entities are touched within a threshold time are selected and performs processes described below.

If the different link entities are touched and selected, the controller 22 sets a touch region of a corresponding size including the touch size, displays a window which enlarges and displays contents displayed on the touch region by a certain magnification, and waits for touch and selection of a corresponding link entity on the window (step 403). That is, the user may touch and select one of the enlarged link entities.

If one of the enlarged link entities is touched and selected (step 405), the controller 22 changes the current picture to a picture corresponding to the selected link entity (step 407). If one of the enlarged link entities is not selected and removal of the window is requested (step 411), the controller 22 closes the window (step 413). For example, if the user touches a touch region which is outside of the window, the removal of the window may be requested.

However, if the different link entities are not touched and selected, that is, if only one link entity is touched and selected, the controller 22 changes the current picture to a picture corresponding to the corresponding selected link entity (step 409).

Figure 4B:
FIG. 4B and FIG. 4C illustrate a picture useful for selecting a corresponding link entity in a web browser environment according to another embodiment of the present invention.
Figure 4C:
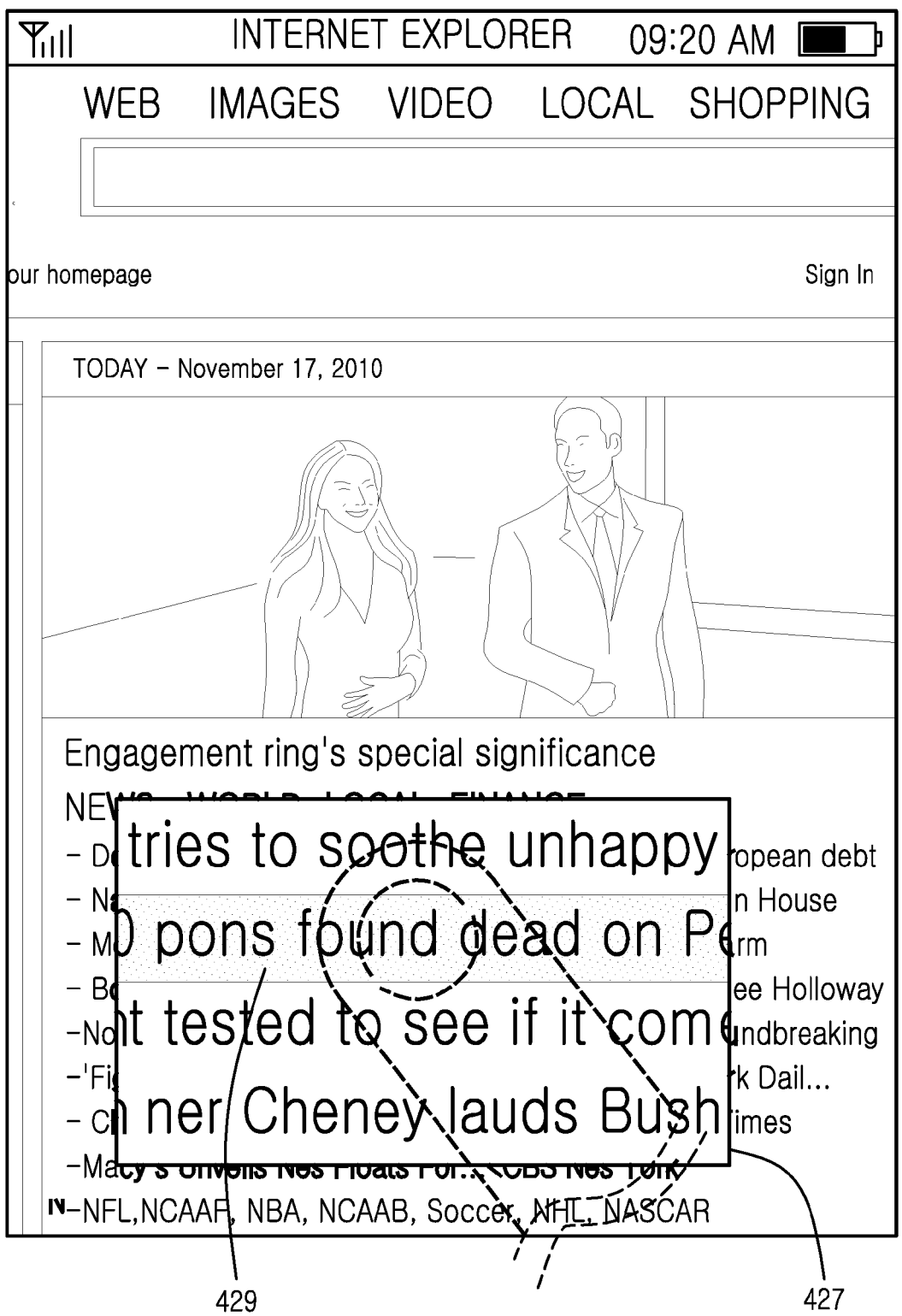

FIG. 4B and FIG. 4C illustrate a displayed picture useful for selecting a corresponding link entity in a web browser environment according to another embodiment of the present invention which may use the process of FIG. 4A.

Referring to FIG. 4B and FIG. 4C, if a finger 421 of a user is in contact with a touch region, a certain touch size 423 is generated. One link entity may exist within the touch size 423 or a plurality of link entities may exist within the touch size 423. That is, one link entity may be touched and selected, or a plurality of link entities may be touched and selected. If one link entity is touched and selected, the current picture may be changed to a picture corresponding to the selected link entity. However, if a plurality of link entities are touched and selected, the controller 22 sets a touch region 425 of a certain size including the touch size 423 and displays a window 427 which enlarges and displays contents displayed on the touch region 423 by a certain magnification. The user may then touch and select one of the link entities enlarged and displayed on the window 427. That is, the user may select intended desired one 429 of the link entities enlarged and displayed on the window 427 without making an erroneous touch. If the user touches a region outside of the window 427, the controller 22 closes the window 427.

In summary, several embodiments of the present invention have been described for a method and apparatus for selecting link entities in a touch screen based web browser environment which allows a user to more easily select one of a plurality of concentrated link entities without an erroneous touch.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for displaying contents in electronic device having a touch screen, the method comprising:
    detecting a touch contact area defined by sensed points of a touch contact on the touch screen while displaying a current picture including a plurality of link entities on the touch screen;
    determining whether different link entities are concurrently touched or a single link entity is touched by the touch contact;
    in response to a determination that the different link entities are concurrently touched by the touch contact:
        setting a region of a size including the touch contact area;
        displaying, on the touch screen, a window which enlarges and displays contents displayed in the region by a certain magnification, the contents including the different link entities that were concurrently touched;
        if one of the enlarged different link entities is touched within the window, changing the current picture on the touch screen to a picture corresponding to the one of the link entities touched within the window; and
        if a request for closing the window is detected by detecting a subsequent user touch outside the window, closing the window; and
    in response to a determination that the single link entity is touched by the touch contact, changing the current picture on the touch screen to a picture corresponding to the touched single link entity without displaying a window which enlarges and displays contents within the touch contact area.

2. An electronic device comprising:
    a touch screen; and
    a controller configured to:
        detect a touch contact area defined by sensed points of a touch contact on the touch screen while displaying a current picture including a plurality of link entities on the touch screen;
        determine whether different link entities are concurrently touched or a single link entity is touched by the touch contact;
        in response to a determination that different link entities are concurrently touched by the touch contact:
            set a region of a size including the touch contact area;
            display, on the touch screen, a window which enlarges and displays contents displayed in the region by a certain magnification, the contents including the different link entities that were concurrently touched;
            if one of the different link entities is touched within the window, changing the current picture on the touch screen to a picture corresponding to the one of the link entities touched within the window; and
            close the window if a request for closing the window is detected by detecting a subsequent user touch outside the window; and
        in response to a determination that the single link entity is touched by the touch contact, change the current picture to a picture corresponding to the touched single link entity without displaying a window which enlarges and displays contents within the touch contact area.

3. The electronic device of claim 2, further comprising a communication unit for transmitting and receiving a wire or wireless signal.

4. The method of claim 1, further comprising:
    waiting for touch and selection of one of a plurality of link entities enlarged and displayed in the window.

5. The electronic device of claim 2, wherein the controller is configured to wait for touch and selection of one of a plurality of link entities enlarged and displayed in the window.

6. A non-transitory computer-readable recording medium having stored therein program instructions, which when executed by a processor of an electronic device having a touch screen, causes the electronic device to perform a method for displaying contents comprising:
    detecting a touch contact area defined by sensed points of a touch contact on the touch screen while displaying a current picture including a plurality of link entities on the touch screen;
    determining whether different link entities are concurrently touched or a single link entity is touched by the touch contact;
    in response to a determination that the different link entities are concurrently touched by the touch contact:
        setting a region of a size including the touch contact area;
        displaying, on the touch screen, a window which enlarges and displays contents displayed in the region by a certain magnification, the contents including the different link entities that were concurrently touched;
        if one of the enlarged different link entities is touched within the window, changing the current picture on the touch screen to a picture corresponding to the one of the link entities touched within the window; and
        if a request for closing the window is detected by detecting a subsequent user touch outside the window, closing the window; and
    in response to a determination that the single link entity is touched by the touch contact, changing the current picture on the touch screen to a picture corresponding to the touched single link entity without displaying a window which enlarges and displays contents within the touch contact area.

* * * * *